July 17, 1923.
1,461,738
J. RUMPF
REDUCING VALVE
Filed Jan. 28, 1919
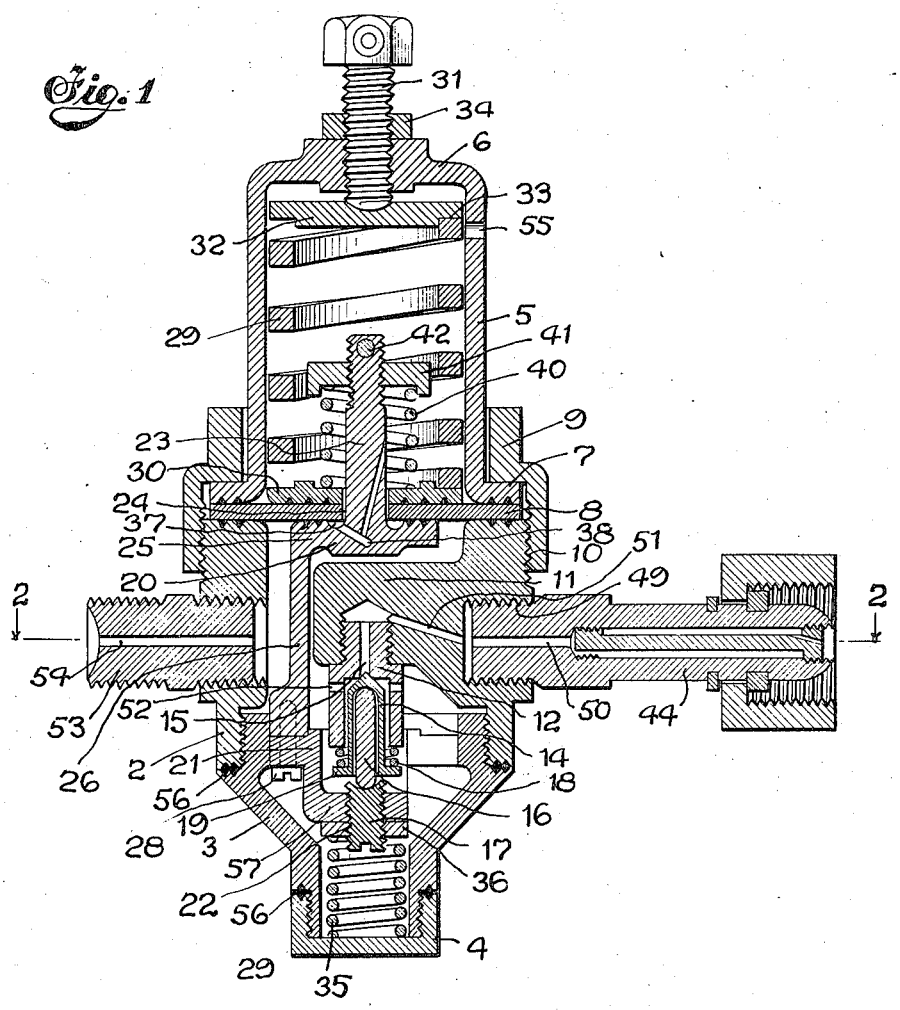
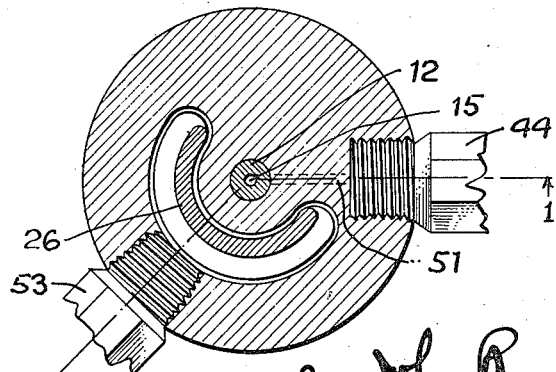

Patented July 17, 1923.

1,461,738

UNITED STATES PATENT OFFICE.

JOHN RUMPF, OF JERSEY CITY, NEW JERSEY, ASSIGNOR TO THE SAFETY CAR HEATING & LIGHTING COMPANY, A CORPORATION OF NEW JERSEY.

REDUCING VALVE.

Application filed January 28, 1919. Serial No. 273,589.

*To all whom it may concern:*

Be it known that I, JOHN RUMPF, a citizen of the United States, and a resident of Jersey City, county of Hudson, and State of New Jersey, have invented an Improvement in Reducing Valves, of which the following is a specification.

This invention relates to gas utilization and with regard to its more specific features to pressure reducing valves.

One of the objects of the invention is to provide a valve of the above type, of simple, reliable and durable construction.

Another object is to provide a device of the above type which shall neither become damaged nor dangerous to persons or objects nearby when for any reason the valve fails to operate as it should.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the following claims.

In the accompanying drawings wherein is shown one of various possible embodiments of the several features of this invention, Fig. 1, is a view of my reducing valve in vertical section, along the line 1—1 of Fig. 2.

Fig. 2, is a transverse sectional view taken along the line 2—2 of Fig. 1.

Similar reference characters refer to similar parts throughout the several views of the drawings.

Referring now to the drawings, I have shown a valve casing comprising a fitting 2, substantially cylindrical externally, preferably machined from a brass rod to avoid the pores usually resulting from casting.

To the lower end of fitting 2, I preferably thread a funnel shaped fitting 3, having a cap 4 threaded thereon, gaskets 56 insuring tight engagement between these parts. Above fitting 2, I mount a cylindrical casing member 5 substantially closed at its upper end as shown at 6, and having an opening 55 leading to the external air. The member 5 has a flange 7 resting on a diaphragm 8 closing the top of fitting 2, and a union 9 preferably rests upon said flange and is threaded to fitting 2 as shown at 10, thereby clamping diaphragm 8 in position.

Integral with fitting 2, and extending past its axis, I provide a ledge 11, having threaded into its lower surface a valve seat member 12. Co-operating therewith is a two-part valve member comprising a hollow seating member 14, having a tapered end adapted to close the passage 15 of the valve seat, and a rounded pin 16 resting within said hollow member 14, and being held in position by a plug 17 to be described below. A light coil spring 18 is preferably disposed between a part of the seat member and a flange 19 formed on and integral with valve 14.

The plug 17 in effect constitutes a part of a valve controlling member 20. This valve controlling member preferably comprises a stem 23 extending through a central opening 24 in diaphragm 8, and an integral disc member 25 resting against the lower surface of the diaphragm. From the lower side of disc 25, this controlling member takes the form of a partially cylindrical skirt 26, substantially encircling the outline of ledge 11, as appears more clearly in Fig. 2. To the lower edge of skirt 26, a bracket member 21 is secured by screws attached as at 28. This bracket member has a part 57, within which the plug 17 above referred to is threaded as shown at 22, being substantially locked in adjusted position by lock nut 36.

A heavy coil spring 29 is located within casing member 5, pressing at its lower end against a washer 30, which rests on diaphragm 8.

The spring 29 is kept at the desired compression by a screw 31 extending through the top 6 of casing member 5, and actuating a follower 32, having a seat 33 for the upper end of coil spring 29. The screw 31 is preferably held against any undesired loosening by means of a lock nut 34.

At the lower end of the reducing valve I provide a coil spring 35, weaker than coil spring 29, the lower end of said coil spring pressing against cap 4 and the upper end against nut 36, whereby spring 35 tends to close valve 14.

If for any reason the valve should fail to close when the pressure within the pressure chamber reaches the value for which operation is designed to take place, this pressure might reach excessive values and break the diaphragm 8, or do other damage. To avoid this I provide an annular groove 37 in disc 25 adjacent to stem 23, and a circuitous channel 38, extending from groove 37 through the stem 23, to allow the escape of gas from the pressure chamber within fitting 2 to the interior of casing member 5, when the pressure exceeds a predetermined value.

To effectively prevent entrance of gas from the pressure chamber into groove 37, under normal pressure conditions, I preferably provide a safety valve coil spring 40, co-axial with and substantially aligned with annular groove 37. This spring presses the diaphragm against disc 25, thus separating groove 37 from the pressure chamber. The spring 40 is maintained under proper compression by a nut 41 threaded on the outer end of stem 23, which nut is prevented by pin 42 from working its way off the stem.

To insure the entrance of purified gas into the reducing valve from the reservoir in which the gas is stored, I preferably employ a gas strainer 44, of the type disclosed and claimed in the co-pending application of George E. Hulse, Serial No. 273,532, filed Jan. 28, 1919, Patent 1,441,684, Jan. 9, 1923.

The strainer 44 is preferably threaded into fitting 2, as shown at 49, a passage 50 in said member communicating with a passage 51 in ledge 11, said passage 51 leading into passage 15 of the valve seat.

The valve when open allows gas to escape from passage 15 through openings 52 into the pressure chamber proper. After the gas has passed through the reducing valve, it is allowed to escape through a screw plug 53, having a longitudinal duct 54 therein and threaded into fitting 2. This screw plug may be connected to the welding torch or other gas consuming device.

When the gas is drawn off by opening the control valve (not shown) connected to the torch or other gas consuming device, the pressure of spring 29 acting on control member 20, depresses plug 17 against the pressure of spring 35, thereby allowing spring 18 to open valve 14.

Although the construction above described is of value in various relations, nevertheless it possesses particular advantages in reducing the pressure of highly compressed gases such as oxygen, acetylene or Pintsch gas, stored in pressure tanks connected therewith so that after passing through my reducing valve the gas shall have the proper pressure for burning by the usual torch used for welding or for other industrial purposes.

The operation of my reducing valve is substantially as follows:

When the controlling valve (not shown) above referred to is opened, the oxygen, Pintsch or other gas stored under high pressure in the reservoir forces its way through strainer 44, any impurities therein being removed by said strainer. Thence it goes through passages 50, 51 and 15, past the open valve 14 through openings 52, into the pressure chamber within fitting 2. From the pressure chamber the gas passes through duct 54 within screw plug 53 to the gas consuming device.

As long as the pressure of the gas within the pressure chamber does not exceed a predetermined value, this operation proceeds. If the pressure, however, should reach a value above the desired one, this higher pressure acting upon diaphragm 8 and disc 25, causes an expansion of the diaphragm against compression spring 29, this action being aided by spring 35, whereby the valve controlling member 20 is raised and valve 14 is closed by the raising of plug 17 which in turn raises the rounded pin 16 of the valve 14. All back lash between the valve parts is taken up by the coil spring 18. The valve being now closed, no further gas can enter the pressure chamber, and as the pressure becomes reduced to normal value, spring 29 pushes the diaphragm 8 back to its original position, overcoming spring 35, whereby the valve controlling member 20 is lowered, and with it is lowered plug 17, thereby allowing the action of gravity and of spring 18 to again open valve 14, and to permit the action first described to proceed. In this manner, the valve will be automatically controlled in accordance with the pressure in the pressure chamber; when this pressure tends to exceed a certain predetermined amount, the inlet will be throttled, and conversely when it falls below, the valve will be automatically opened to remedy such condition. As a result, the pressure in the pressure chamber is automatically held at a predetermined value and this value may be changed at will by a suitable adjustment of the controlling spring.

If valve 14 should fail to close properly when it is intended to close, as because of the presence of solid particles on the valve seat, the pressure within the pressure chamber will of course reach a value substantially that within the gas reservoir, this pressure being materially higher than that designed to be maintained therein. When this occurs, the excess pressure in a manner similar to that above described, causes expansion of diaphragm 8 but as the valve is prevented from closing, valve control member 20 does not move upward with diaphragm 8. Diaphragm 8 thereby moving away from disc 25, the gas under excessive pressure is permitted to flow between disc 25 and diaphragm 8 into the circuitous duct 38 within stem 23, and thence into the chamber within casing member 5. From this chamber the gas then escapes to the external air through opening 55.

It is thus seen that when the valve fails to close, the pressure from the pressure chamber is relieved by permitting gas to escape into the adjoining chamber and from there to the open air. The pressure within the reducing valve on operation of the safety valve is therefore maintained of substantially equal values on both sides of the diaphragm 8, thus guarding against any danger of destroying the diaphragm or causother destructive action.

When the operative condition of the valve member 14 is restored so that it can again seat itself, the pressure within chamber 2 resuming a safe value, the safety valve spring 40 compresses the diaphragm against disc 25 to again separate the duct 38 and groove 37 to prevent passage of gas thereto from the pressure chamber.

I provide three adjustments in my reducing valve to insure proper action. By manipulation of bolt 31, I force spring 29 under sufficient compression to cause closing of valve 14 for any predetermined gas pressure. By adjusting the position of plug 17, I secure the proper seating pressure of the valve under normal operation, and by adjustment of nut 41, the safety valve spring 40 is placed under a compression to cause operation of the safety valve for any predetermined pressure.

It will thus be seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent of the United States is:—

1. In a reducing valve, in combination, a pressure chamber, a valve seat therein, a diaphragm closing one side of said chamber, a valve controlling member movable with said diaphragm, and a separate valve member having means biasing it away from said seat, and adapted to be pressed by said controlling member against said seat.

2. In a reducing valve, in combination, a pressure chamber, a valve seat therein, a diaphragm responsive to the pressure of gas within said chamber, a valve controlling member movable by said diaphragm, a separate valve member adapted to be pressed by said controlling member to closed position and a spring associated with said valve to bias it to open position.

3. In a reducing valve, in combination, a pressure chamber, a valve seat therein, a diaphragm responsive to the pressure of gas within said chamber, a valve controlling member movable with said diaphragm, a two part valve member, comprising a hollow member directly contacting said seat, a pin loosely disposed therein, and contacted by said controlling member to press the valve against its seat, and a spring to take up back lash between the valve parts and tending to unseat said valve.

4. In a reducing valve, in combination, a pressure chamber, a valve seat therein, a diaphragm closing one side of said chamber, a valve controlling member movable with said diaphragm, a pin in connection with said member, a valve member, pressed by said pin and said controlling member against said seat, and means on said controlling member for adjusting the pressure with which said valve is seated.

5. In a reducing valve, in combination, a pressure chamber, a valve seat therein, a valve therefor, a diaphragm responsive to the pressure of gas within said chamber, a controlling member for said valve under the control of said diaphragm, a spring opposing expansion of said diaphragm, and means tending to unseat said valve.

6. In a reducing valve, in combination, a pressure chamber having an outlet connected therewith, a diaphragm therefor, a central opening in said diaphragm, a metallic disk surrounding said opening, means for pressing said disk against said diaphragm, and a valve connected to said disk, whereby if said valve does not close upon excessive pressure, said diaphragm will separate from said disk allowing escape of gas from said pressure chamber and said outlet.

7. In a reducing valve, in combination, a pressure chamber having an outlet connected thereto, a diaphragm therefor, a rod extending through a central opening in said diaphragm, and having a flange held against said diaphragm by pressure within said chamber, a valve, connected to said rod, and a passage in said rod, closed by contact of said diaphragm and said flange, whereby upon excessive pressure due to failure of said valve to function, a by-pass will be opened for escape of gas past said diaphragm.

8. In a reducing valve, in combination, a pressure chamber having an outlet connected thereto, a diaphragm therefor, a disk closing an opening in said diaphragm, opposing springs pressing said diaphragm and said disk together, a valve controlling entrance of gas to said pressure chamber, said valve being connected to said disk, whereby upon excessive pressure due to failure of said valve to function, a by-pass will be opened for escape of gas past said diaphragm.

9. In a reducing valve, in combination, a pressure chamber having an outlet connected thereto, a diaphragm therefor, a rod, extending through a central opening in said diaphragm and having a flange surrounding said opening on the pressure side of said diaphragm, a valve connected to said rod, a circuitous passage in said rod, closed by contact of said diaphragm and said flange, and a spring surrounding said rod, and pressing said diaphragm against said flange.

10. In a reducing valve, in combination, a pressure chamber having an outlet connected thereto, a diaphragm therefor and having an opening therein, a valve for said chamber, means forming a connection between said diaphragm and said valve and having a shoulder adapted normally to contact with said diaphragm thereby to seal said opening in said diaphragm, whereby for normal operation said diaphragm, said connecting means and said shoulder move as a unit to control said valve and, upon excessive pressure due to failure of said valve to function, said diaphragm will separate from said shoulder to allow escape of fluid from said chamber through said opening.

11. In a reducing valve, in combination, a pressure chamber having an outlet connected thereto, a diaphragm therefor, a rod extending through a central opening in said diaphragm, and having an adjustable nut near its free end, a flange on said rod, surrounding said opening, on the pressure side of said diaphragm, a valve connected to said rod, a circuitous passage in said rod closed by contact of said diaphragm and said flange, and a spring surrounding said rod, and pressing against said diaphragm and said nut.

12. In a reducing valve, in combination, a pressure chamber having an outlet connected thereto, a valve seat therein, a diaphragm closing one side of said chamber, a main valve controlling member passing through an opening in said diaphragm, and having a flange held against the pressure side of said diaphragm, and a safety valve passage closed by contact of said diaphragm and said flange.

13. In a reducing valve, in combination, a casing, a diaphragm separating said casing transversely into two compartments, a valve seat in said lower compartment, a valve controlling member extending through said diaphragm, and having a flange held against the pressure side thereof, a safety passage closed by contact of said flange and said diaphragm, a spring tending to close said safety passage, and a second concentric spring tending to open said valve.

14. In a reducing valve, in combination, a pressure chamber, a valve seat therein, a valve therefor provided with a flange, a diaphragm responsive to the pressure of gas within said chamber, a controlling member for said valve attached to said diaphragm and extending beyond said valve, a spring opposing expansion of said diaphragm, and a spring connected to said valve and operating through said flange thereon tending to unseat said valve.

15. In a reducing valve, in combination, a pressure chamber, a valve seat therein, a valve therefor provided with a flange, a pin in engagement with said valve, a diaphragm responsive to the pressure of gas within said chamber, a controlling member for said valve attached to said diaphragm and contacting with said pin, a spring opposing expansion of said diaphragm and a spring operating upon said flange tending to open said valve and to maintain contact between said controlling member and said pin.

16. In a reducing valve, in combination, a pressure chamber, a valve seat therein, a valve therefor, a pin in connection with said valve, a diaphragm responsive to the pressure of gas within said chamber, a controlling member for said valve attached to said diaphragm and contacting with said pin, means on said controlling member for adjusting the contact of said member with said pin and a spring mounted on said valve tending to open said valve and to maintain positive contact between said pin and said controlling member.

In testimony whereof, I have signed my name to this specification this 21st day of January, 1919.

JOHN RUMPF.